United States Patent
Dabak et al.

(10) Patent No.: US 8,792,567 B2
(45) Date of Patent: Jul. 29, 2014

(54) PREAMBLE SEQUENCE EXTENSION

(75) Inventors: Anand G. Dabak, Plano, TX (US); Tarkesh Pande, Dallas, TX (US); Il Han Kim, Dallas, TX (US); Ramanuja Vedantham, Allen, TX (US); Kumaran Vijayasankar, Dallas, TX (US); Gang Xu, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 25 days.

(21) Appl. No.: 13/526,227

(22) Filed: Jun. 18, 2012

(65) Prior Publication Data
US 2012/0320996 A1    Dec. 20, 2012

Related U.S. Application Data

(60) Provisional application No. 61/498,341, filed on Jun. 17, 2011.

(51) Int. Cl.
*H04B 3/00* (2006.01)

(52) U.S. Cl.
USPC .......................................... 375/257

(58) Field of Classification Search
USPC .......................................... 375/257
See application file for complete search history.

(56) References Cited

U.S. PATENT DOCUMENTS

| | | | |
|---|---|---|---|
| 2010/0195636 A1* | 8/2010 | Nakashima et al. | 370/342 |
| 2010/0240367 A1* | 9/2010 | Lee et al. | 455/435.2 |
| 2010/0272192 A1 | 10/2010 | Varadarajan et al. | |
| 2010/0290408 A1* | 11/2010 | Steudle et al. | 370/329 |
| 2010/0315939 A1* | 12/2010 | Verbin et al. | 370/201 |
| 2012/0093198 A1 | 4/2012 | Dabak et al. | |
| 2012/0300743 A1* | 11/2012 | Kim et al. | 370/329 |

* cited by examiner

*Primary Examiner* — Santiago Garcia
(74) *Attorney, Agent, or Firm* — Steven A. Shaw; Wade James Brady, III; Frederick J. Telecky, Jr.

(57) ABSTRACT

A method of powerline communications between a plurality of nodes on a powerline communications (PLC) channel including a first node and a second node. At least one communication quality measure is determined for the PLC channel. Based on the communication quality measure, a preamble of a data frame is dynamically switched between a reference preamble having a reference symbol length including a reference number of syncP symbols and a reference number of syncM symbols and at least a first extended preamble having an extended symbol length that is greater than (>) the reference symbol length. The data frame is then transmitted on the PLC channel.

12 Claims, 3 Drawing Sheets

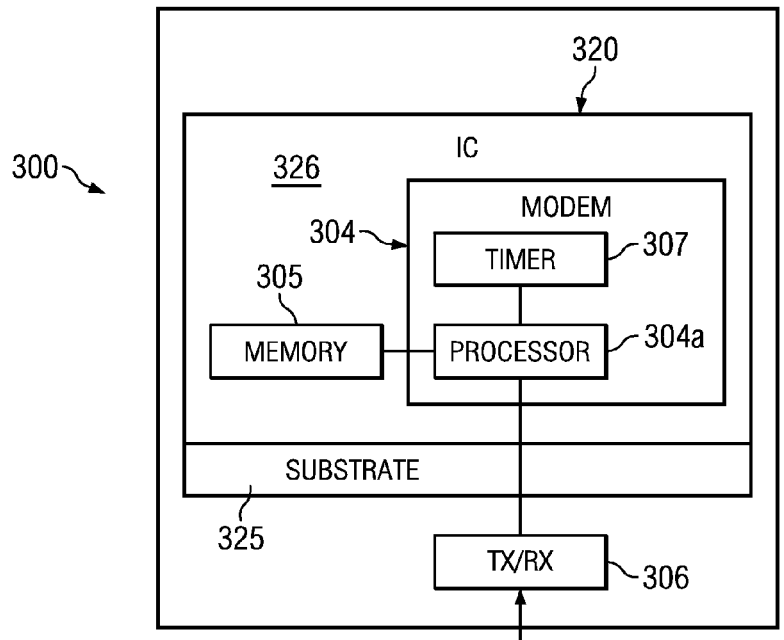

FIG. 3  TO POWERLINE 340

METHOD 400

| DETERMINING AT LEAST ONE COMMUNICATION QUALITY MEASURE ON A POWERLINE COMMUNICATIONS (PLC) CHANNEL IN A PLC NETWORK INCLUDING A FIRST NODE AND A SECOND NODE | 401 |

| BASED ON THE COMMUNICATION QUALITY MEASURE, DECIDING WHETHER TO DYNAMICALLY SWITCH A PREAMBLE OF A DATA FRAME BETWEEN A REFERENCE PREAMBLE HAVING A REFERENCE SYMBOL LENGTH INCLUDING A REFERENCE NUMBER OF syncP SYMBOLS AND A REFERENCE NUMBER OF syncM SYMBOLS AND AT LEAST A FIRST EXTENDED PREAMBLE HAVING AN EXTENDED SYMBOL LENGTH THAT IS GREATER THAN (>) THE REFERENCE SYMBOL LENGTH | 402 |

| TRANSMITTING THE DATA FRAME ON THE PLC CHANNEL | 403 |

FIG. 4

PREAMBLE SEQUENCE EXTENSION

CROSS REFERENCE TO RELATED APPLICATIONS

This application and the subject matter disclosed herein claims the benefit of Provisional Application Ser. No. 61/498, 341 entitled "PREAMBLE SEQUENCE EXTENSION" filed Jun. 17, 2011, which is herein incorporated by reference in its entirety.

FIELD

Disclosed embodiments relate generally to the field of communications including powerline communications.

BACKGROUND

Powerline communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Current and next generation narrowband PLC are multi-carrier based, such as orthogonal frequency division multiplexing (OFDM)-based (as opposed to single carrier-based) in order to get higher network throughput. OFDM uses multiple orthogonal subcarriers to transmit data over frequency selective channels. A conventional OFDM structure for a data frame includes a preamble, followed by a physical layer (PHY) header, a media access control (MAC) header, followed by a data payload.

PLC channels are known to be highly challenging environments for digital communication because they suffer from periodic bursts of impulse noise, and the channel impulse response also varies over time. As an example, FIG. 1 shows a plot of the channel response of a PLC channel (without any added loads thereon) as a function of time (in msec) for a medium voltage (MV) to low voltage (MV-LV) powerline in the US-grid for the Federal Communications Commission (FCC)-band (150 kHz to 500 kHz). It can be seen that the response of the PLC channel itself is periodically time-varying with a period of about 8 msec, or approximately ½ the AC mains cycle duration. Nulls or troughs in the PLC channel response can be seen to occur every period corresponding to times of minimum channel response.

A conventional preamble structure for a narrowband OFDM PLC standard, e.g. IEEE P1901.2, or G3, includes 8 syncP symbols followed by 1.5 syncM symbols. There is no cyclic prefix between adjacent symbols in the preamble. As known in the art, syncP is a known preamble sequence, and syncM=−syncP. As example, a syncP preamble can be a chirp-like sequence (there many possibilities depending on the chirp rate), a specific binary sequence of 1's and −1's, or a cazac sequence. The definition of the syncP symbol for the FCC band in IEEE P1901.2 involves specifying phases at different tones.

The preamble serves purposes including the following purposes:
1) helps to indicate to other nodes in the PLC network that a transmission is in progress;
2) helps to determine the frame boundary (i.e. the boundary between the preamble and the PHY header, and between the PHY header and the data),
3) can be used to obtain accurate channel estimates, and
4) can be used for frequency offset compensation.

SyncM symbols help determine the frame boundary. The repetitive syncP symbols also assists in preamble detection as receiver nodes are looking for the repetitive sequence of symbols in the PLC channel to determine whether or not a frame is on the powerline. Multiple syncP's also help in obtaining more accurate channel estimates because averaging the channel estimates across multiple syncP's helps reduce the noise. Improved channel estimates also helps in improving the header decoding performance, especially when the header is coherently modulated with respect to the syncP preamble.

SUMMARY

Disclosed embodiments recognize although the conventional preamble structure for powerline communications (PLC) standards described above generally provide helpful features including preamble detection and helping to determine the frame boundary, if the preamble occurs at a time during or near one of the nulls or troughs of the PLC channel response, the preamble may not be detected. Furthermore, even when successful preamble detection does occur, if the syncM symbols occur during or near the null part of the PLC channel response, then frame boundary detection may not be possible. Disclosed embodiments provide dynamic switching based on at least one communication quality measure between a reference preamble (e.g., the conventional narrowband OFDM PLC standard preamble) and an extended preamble having an extended symbol length relative to the symbol length of the reference preamble, by adding syncP and/or syncM symbols to the reference preamble.

One embodiment comprises a method of powerline communications between a plurality of nodes on a PLC channel including a first node and a second node. At least one communication quality measure is determined for the PLC channel. Based on the communication quality measure, a preamble of the data frame is dynamically switched between a reference preamble having a reference symbol length including a reference number of syncP symbols and a reference number of syncM symbols and at least a first extended preamble having an extended symbol length that is greater than (>) the reference symbol length. The data frame is then transmitted on the PLC channel.

BRIEF DESCRIPTION OF THE DRAWINGS

Reference will now be made to the accompanying drawings, which are not necessarily drawn to scale, wherein:

FIG. 3 is a block diagram schematic of a communication device having a disclosed modem that implements operation on a PLC channel of a PLC network including dynamic switching based on at least one communication quality measure between a reference preamble and an extended preamble having an extended symbol length, according to an example embodiment.

FIG. 4 is a flow chart for an example method of PLC communications including dynamic switching based on at least one communication quality measure between a reference preamble and an extended preamble having an extended symbol length, according to an example embodiment.

DETAILED DESCRIPTION

Disclosed embodiments now will be described more fully hereinafter with reference to the accompanying drawings. Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents. As used herein, the term "couple" or "couples" is intended to mean either an indirect or direct electrical connection unless qualified as in "communicably coupled" which includes wireless connections. Thus, if a first device couples to a second device, that connection may be through a direct electrical connection, or through an indirect electrical connection via other devices and connections.

Disclosed embodiments provide new preamble structures for PLC frames which improve preamble detection and frame boundary detection as compared to the conventional preamble structures, and in one embodiment can also improve header decoding. One embodiment comprises dynamic switching of preambles based on at least one communication quality measure between a reference preamble and an extended preamble that has an extended symbol length.

When prompted by a communication quality measure being in a degraded state, the preamble length can be increased from a reference preamble having a reference symbol length (a reference number of syncP symbols and a reference number of syncM symbols, such as 8 and 1.5, respectively) by introducing added (more) syncP-type symbols until the extended preamble is greater than a ¼ of the AC mains cycle duration. As noted above, in the case of a conventional preamble structure for a narrowband OFDM PLC standard the reference number of syncP symbols is 8.

Figure 1:
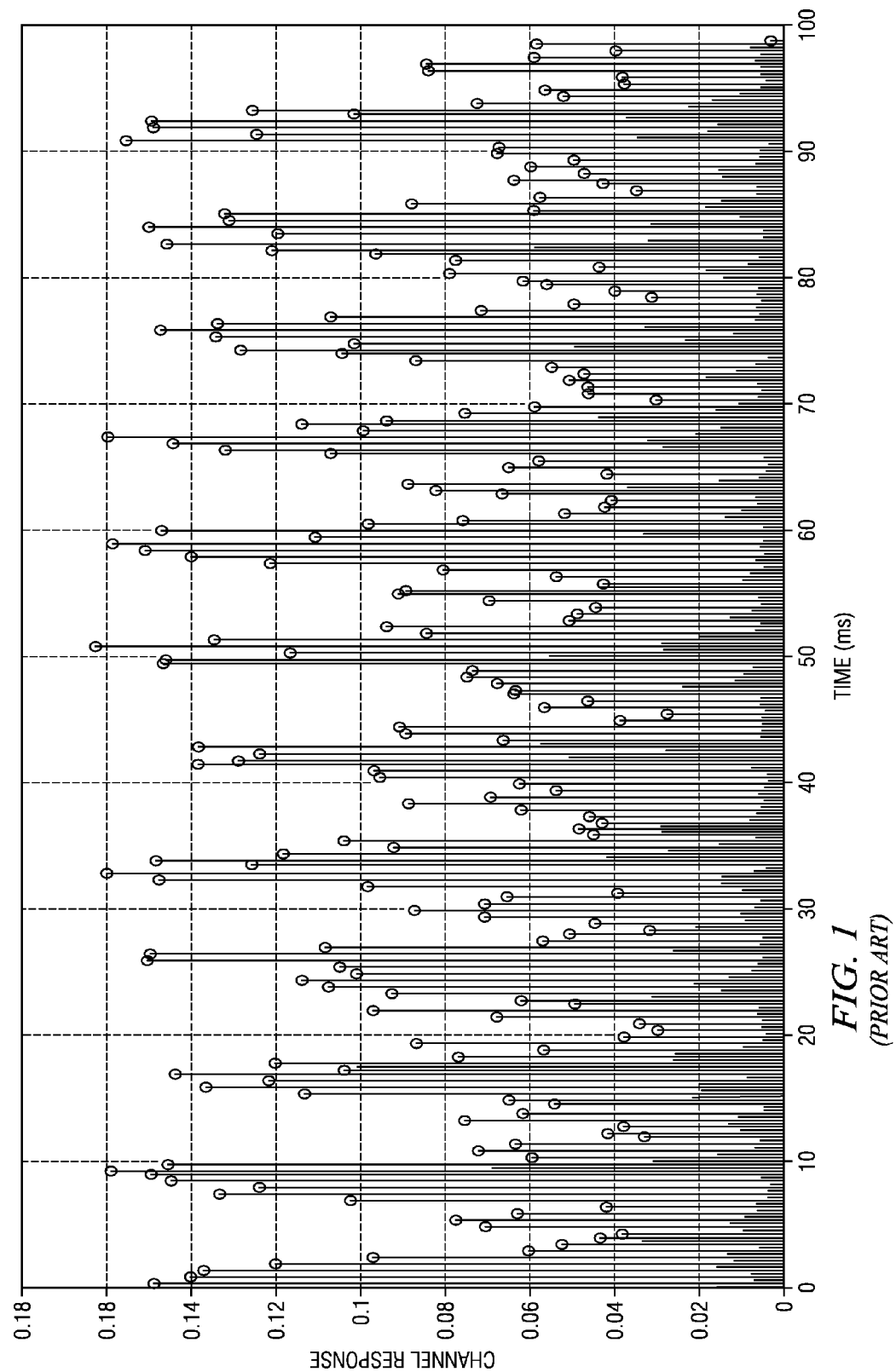
FIG. 1 shows a plot of the channel response of a PLC channel as a function of time (in msec) for a medium voltage (MV) to low voltage (MV-LV) powerline in the US-grid for the FCC-band (150 to 500 kHz).

In some embodiments the number of syncP symbols added (referred to herein as X) is based on a function which monotonically increases as the communication quality measure decreases, based on at least one of the channel response (see FIG. 1) and the noise profile of the PLC channel. If the channel response is good and there is no significant noise on the PLC channel, then no extra syncP symbols can be added. If the channel response is highly selective (i.e. channel response is poor) and/or the channel is noisy, then extra syncP symbols can be added. X can be set by allowing a total number of syncP symbols referred to herein as N1, as follows:

$N1=8$(or other reference number of sync$P$ symbols)+$X$ (added)symbols

X can be chosen from the subset {4, 6, 8, 10, 12, 14, 16, 18, 20, 24} of symbols. X may also be multiples of 2 (even numbers), or odd numbers. In these embodiments the increase in preamble length can be directly inversely related to the communication quality measure. For example, X can=4 when the communication quality measure is just below a communication quality measure threshold that divides an acceptable channel response and/or noise from an unacceptable channel response and/or noise, while the maximum number of added symbols, X=24 in this example, can be added in the case of a very highly degraded channel response and/or noise, while an intermediate number of added symbols, X=14 in this example, can be used in the case of a moderately degraded channel response and/or noise.

In other embodiments, the preamble length may only be increased from the reference symbol length if the communication link between two nodes is sufficiently poor to result in at least one transmitted frame being dropped. As an example, for a PLC communication link between a transmitter node A and a receiver node B on a PLC channel, the following events can occur:

a) At least one frame is dropped by node B, i.e., node B fails to reliably decode the frame and therefore does not generate an acknowledgement (ACK) frame.

b) The ACK frame (ACK response) fails the cyclic redundancy check (CRC) at node A i.e., node B was able to reliably decode the frame(s) from node A and generate an ACK response, but its ACK response failed to be reliably decoded by node A.

In either of the above-described scenarios, either node A or node B, or both nodes A and B, may increase their preamble length from the reference symbol length by adding X syncP symbols. As an example, if event a) occurs y number of times, such as a number of occurrences (y) within a given time interval to define a drop rate, where y is a configurable parameter for a given PLC network, then node A may increase the preamble length for its transmitted frames. If node B is able to reliably decode the frame from node A, but it determines that it is receiving the same frame multiple times, this can be taken to indicate that the ACK response is failing at node A and hence node B may then increase its preamble length from the reference symbol length to an extended symbol length by adding X syncP symbols.

Figure 2A:
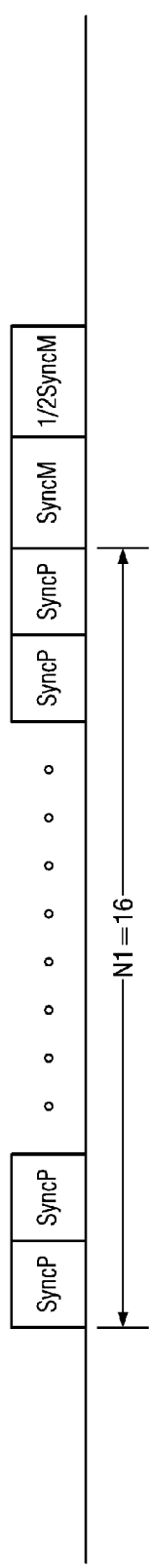
FIG. 2A shows an example extended preamble having a plurality of added syncP symbols, according to an example embodiment.

Preamble length extension to realize an extended preamble can be performed by a variety of methods, such as either one of the following example methods described below. In a first example method, the additional syncP symbols can be added to the beginning of the preamble. FIG. 2A illustrates an example extended preamble having an extended symbol length that is > the reference symbol length, for the particular case where X=8 so that there are N1=16 syncP symbols in the extended preamble.

Figure 2B:
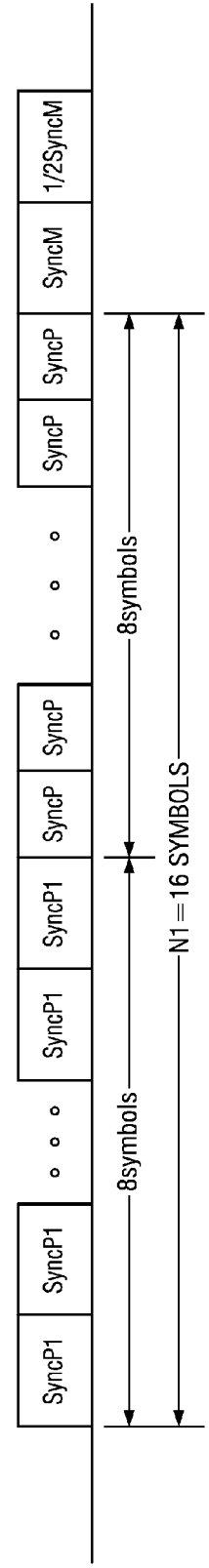
FIG. 2B shows an example extended preamble having a plurality of added new SyncP symbols referred to herein as SyncP1 symbols, according to an example embodiment.

In a second example method to realize an extended preamble, a new syncP symbol denoted herein as "SyncP1" is first defined. SyncP1 may be appended to the front or the back of the reference (conventional) preamble structure. Appending SyncP1's to the front of the preamble assists in backwards compatibility for single-carrier based legacy nodes that are able to detect only syncP symbols which have preamble detection algorithms which can only function for a maximum preamble length of eight syncP's. FIG. 2B illustrates an example extended preamble having an extended symbol length (16 total syncP type symbols) that is > the reference symbol length (8 syncP symbols), for the particular case where 8 SyncP1 symbols are appended to the front of the preamble.

The syncP1 symbol can be defined in a wide variety of ways, including in the following example ways. SyncP1 can be the time inverted syncP symbol. As an example of time inverted, if syncP is [a b c d], then time inverted syncP is [d c b a] (and syncM is [−a −b −c −d]). SyncP1 can correspond to a psuedo-random binary sequence. SyncP1 can correspond to the inverse fast Fourier transform (IFFT) of a pseudo random binary sequence used to modulate a group of subcarriers.

SyncP1 can be a chirp sequence whose chirp rate is different from the chirp rate of the syncP sequence in the reference preamble.

The SyncP1 symbol may also be a common symbol across different PLC standards, such as PoweRline Intelligent Metering Evolution (PRIME), G3-PLC (G3), ITU G.hnem, IEEE P1901.2, despite each standard having its own unique syncP. Accordingly, even though the syncP's for the different standards are different, the syncP1 may be common across these various standards. In some embodiments, SyncP1 may be used in preambles regardless of the communication quality measure of the channel.

Disclosed embodiments also include solutions for improving frame boundary detection. This embodiment recognizes frame boundary detection may be improved by increasing the number of syncM symbols in the preamble. As noted above, the conventional preamble structure for a narrowband OFDM PLC standard has 1.5 syncM symbols. Additional syncM symbols may be added to the preamble at the end of the preamble, at the beginning of the preamble, or somewhere within (e.g., at or near the middle) the preamble between two syncP symbols, between a syncP and a syncP1 symbol, or between two syncP1 symbols.

FIG. 3 is a block diagram schematic of a communication device 300 having a disclosed modem 304 that implements operation on a PLC communication channel of a PLC network including dynamic switching based on at least one communication quality measure between a reference preamble and at least one extended preamble having an extended symbol length, according to an example embodiment. Communications device 300 compromises a modem 304 including a processor (e.g., a digital signal processor, (DSP)) 304a having associated memory 305 that implements a disclosed dynamic switching of preamble length algorithm at a service node (SN) which includes switch nodes and terminal nodes, or a base (data concentrator) node in the PLC communications network. Memory 305 comprises machine readable storage, such as static random access memory (SRAM). Modem 304 includes a timer 307, such as for ACK transmission, Carrier Sense Multiple Access/collision avoidance (CSMA)/CA) back-off and data transmission purposes. Although not shown in FIG. 3, the modem 304 can include memory 305.

Transceiver (TX/RX; or analog front end (AFE)) 306 allows coupling of the communications device 300 to the powerline 340. When at a SN, TX/RX 306 facilitates communications with other SNs and the BN on the powerline 340.

The modem 304 is shown formed on an integrated circuit (IC) 320 comprising a substrate 325 having a semiconductor surface 326, such as a silicon surface. In another embodiment the modem 304 is implemented using 2 processor chips, such as 2 DSP chips. Besides the DSP noted above, the processor 304a can comprise a desktop computer, laptop computer, cellular phone, smart phone, or an application specific integrated circuit (ASIC).

Disclosed modems 304 and disclosed communications devices 300 can be used in a PLC network to provide a networked device that in service is connected to a powerline via a power cord. In general, the "networked device" can be any equipment that is capable of transmitting and/or receiving information over a powerline. Examples of different types of networked devices include, but are not limited or restricted to a computer, a router, an access point (AP), a wireless meter, a networked appliance, an adapter, or any device supporting connectivity to a wired or wireless network.

FIG. 4 is a flow chart for an example method of powerline communications between a plurality of nodes on a PLC channel including a first node and a second node including dynamic switching based on at least one communication quality measure between a reference preamble and an extended preamble having an extended symbol length, according to an example embodiment. Step 401 comprises determining at least one communication quality measure for the PLC channel. The communication quality measure can be compared to at least one communication quality limit to determine the communication quality measure. In step 402, based on the communication quality measure it is decided whether to dynamically switch a preamble for a data frame between a reference preamble having a reference symbol length including a reference number of syncP symbols and a reference number of syncM symbols and at least a first extended preamble having an extended symbol length that is > the reference symbol length. Step 403 comprises transmitting the data frame on the PLC channel.

Disclosed embodiments may be applied to a variety of PLC standards, including OFDM-based PLC standards such as PRIME, G3, ITU G.hnem. [IEEE P1901.2].

Many modifications and other embodiments of the invention will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

We claim:

1. A method of powerline communications between a plurality of nodes on a powerline communications (PLC) channel including a first node and a second node, comprising:
   determining at least one communication quality measure for said PLC channel;
   based on said communication quality measure, including at least one of a channel response of said PLC channel and a noise profile of said PLC channel, dynamically switching a preamble of a data frame between a reference preamble having a reference symbol length including a reference number of syncP symbols and a reference number of syncM symbols and at least a first extended preamble having an extended symbol length that is greater than (>) said reference symbol length, wherein:
      if said channel response is greater than or equal to (≥) a predetermined channel response threshold indicating a good response and said noise profile is less than or equal to (≤) a predetermined noise threshold indicating acceptable noise, said reference preamble is selected, and
      if at least one of said channel response is less than (<) said predetermined channel response threshold indicating a poor response and said noise profile is greater than (>) said predetermined noise threshold indicating unacceptable noise, said first extended preamble is selected having an extended number of said syncP symbols which provides X symbols greater than (>) said reference number of said syncP symbols; and
   transmitting said data frame on said PLC channel.

2. The method of claim 1, wherein when said first extended preamble is selected, said X symbols is selected from even numbers.

3. The method of claim 2, wherein said X symbols is based on a function which monotonically increases as said communication quality measure decreases.

4. The method of claim 1, wherein said communication quality measure is a binary measure during PLC communications between said first node acting as a transmitter and said second node acting as a receiver comprising (i) an occurrence of a frame drop or being above a rate of frame drops and ii) no occurrence of said frame drop or being below said rate of frame drops.

5. The method of claim 4, wherein said occurrence of said frame drop is during a frame transmission from said first node to said second node where said second node does not send an Acknowledgment (ACK) frame or comprises a dropped ACK frame from said second node to said first node after said second node reliably decodes said frame transmission.

6. The method of claim 1, wherein said X symbols are added to end of said preamble, at a beginning of said preamble, or within said preamble between two syncP symbols, between a syncP and a syncP1 symbol, or between two of said syncP1 symbols.

7. A modem for communications on a powerline communications (PLC) channel in a PLC network including a first and a second node, comprising:
   a processor;
   a memory comprising machine readable storage, wherein said processor is coupled to access data stored in said memory, wherein said memory stores a dynamic switching of preamble length algorithm and said processor is programmed to implement said algorithm, said algorithm:
      dynamically switching a preamble of a data frame based on at least one communication quality measure, including at least one of a channel response of said PLC channel and a noise profile of said PLC channel, on said PLC channel between a reference preamble having a reference symbol length including a reference number of syncP symbols and a reference number of syncM symbols and at least a first extended preamble having an extended symbol length that is greater than (>) said reference symbol length, wherein:
         if said channel response is greater than or equal to (≥) a predetermined channel response threshold indicating a good response and said noise profile is less than or equal to (≤) a predetermined noise threshold indicating acceptable noise, said reference preamble is selected by said algorithm, and
         if at least one of said channel response is less than (<) said predetermined channel response threshold indicating a poor response and said noise profile is greater than (>) said predetermined noise threshold indicating unacceptable noise, said first extended preamble is selected by said algorithm having an extended number of said syncP symbols which provides X symbols greater than (>) said reference number of said syncP symbols; and
      compiling said data frame including said preamble.

8. The modem of claim 7, wherein said modem is formed on an integrated circuit (IC) comprising a substrate having a semiconductor surface, and wherein said processor comprises a digital signal processor (DSP).

9. The modem of claim 7, wherein said communication quality measure is a binary measure during PLC communications between said first node acting as a transmitter and said second node acting as a receiver comprising (i) an occurrence of a frame drop or being above a rate of frame drops and ii) no occurrence of said frame drop or being below said rate of frame drops.

10. A communications device for communications on a powerline communications (PLC) channel in a PLC network including a first and a second node, comprising:
   a modem, comprising:
      a processor;
      a memory comprising machine readable storage, wherein said processor is coupled to access data stored in said memory, wherein said memory stores a dynamic switching of preamble length algorithm and said processor is programmed to implement said algorithm, said algorithm:
         dynamically switching a preamble of a data frame based on at least one communication quality measure, at least one of a channel response of said PLC channel and a noise profile of said PLC channel, on said PLC channel between a reference preamble having a reference symbol length including a reference number of syncP symbols and a reference number of syncM symbols and at least a first extended preamble having an extended symbol length that is greater than (>) said reference symbol length, wherein:
            if said channel response is greater than or equal to (≥) a predetermined channel response threshold indicating a good response and said noise profile is less than or equal to (≤) a predetermined noise threshold indicating acceptable noise, said reference preamble is selected by said algorithm, and
            if at least one of said channel response is less than (<) said predetermined channel response threshold indicating a poor response and said noise profile is greater than (>) said predetermined noise threshold indicating unacceptable noise, said first extended preamble is selected by said algorithm having an extended number of said syncP symbols which provides X symbols greater than (>) said reference number of said syncP symbols;
         compiling said data frame including said preamble; and
   a PLC transceiver communicably coupled to said modem for transmitting said data frame on said PLC channel.

11. The communications device of claim 10, wherein said modem is formed on an integrated circuit (IC) comprising a substrate having a semiconductor surface, and wherein said processor comprises a digital signal processor (DSP).

12. The communications device of claim 10, wherein said communication quality measure is a binary measure during PLC communications between said first node acting as a transmitter and said second node acting as a receiver comprising (i) an occurrence of a frame drop or being above a rate of frame drops and ii) no occurrence of said frame drop or being below said rate of frame drops.

* * * * *